March 5, 1968 C. A. BARLOW, JR., ETAL 3,372,229

COLOR DISPLAY SYSTEM BY SUPERPOSITION OF A RED IMAGE WITH WARM AND COOL ACHROMATIC IMAGES

Original Filed April 26, 1965 3 Sheets-Sheet 1

Carl A. Barlow, Jr.,
Samuel R. Shorter,
Inventors.

Koenig, Senniger, Powers and Leavitt,
Attorneys.

March 5, 1968 C. A. BARLOW, JR., ETAL 3,372,229

COLOR DISPLAY SYSTEM BY SUPERPOSITION OF A RED IMAGE WITH WARM AND COOL ACHROMATIC IMAGES

Original Filed April 26, 1965 3 Sheets-Sheet 2

Carl A. Barlow, Jr.,
Samuel R. Shortes,
Inventors.
Koenig, Senniger, Powers and Leavitt,
Attorneys.

United States Patent Office 3,372,229

Patented Mar. 5, 1968

3,372,229

COLOR DISPLAY SYSTEM BY SUPERPOSITION OF A RED IMAGE WITH WARM AND COOL ACHROMATIC IMAGES

Carl A. Barlow, Jr., and Samuel R. Shortes, Dallas, Tex., assignors to Texas Instruments Incorporated, Dallas, Tex., a corporation of Delaware Continuation of application Ser. No. 450,705, Apr. 26, 1965. This application Feb. 6, 1967, Ser. No. 614,362
25 Claims. (Cl. 178—5.4)

ABSTRACT OF THE DISCLOSURE

Disclosed are color display systems and methods for producing colored images from a plurality of records. The system includes a viewing screen having first, second and third phosphors which when energized emit light of different wavelengths. Switching means are provided for energizing the first phosphor in response to a first record to produce a corresponding image in light of relatively long wavelengths, for independently simultaneously energizing the first and second phosphors in response to a second record to produce a corresponding image in warm substantially achromatic light, and for independently simultaneously energizing all of the phosphors in response to a third record to produce an image corresponding to the third record in cool substantially achromatic light.

This is a continuation of application Ser. No. 450,705, filed Apr. 26, 1965.

This invention relates to color display systems and, with regard to certain more specific features, to system for cumulatively energizing phosphors to produce pleasingly colored images.

Various color display systems have been proposed which leave much to be desired visually as regards image brightness and the accuracy of rendition of hues and their saturations. For example, in former electronic display systems it has been difficult to obtain and consistently maintain color fidelity, e.g., a satisfactory rendition of flesh colors (which have tended to be unstable and include undesirable green and magenta hues). In some systems it has also been difficult to obtain proper blue hues to represent certain blue subjects such as skies, for example. In addition, prior systems requiring complex depositions of phosphors and shadow masks in their display tubes have been costly to build and difficult to maintain in color balance. These and other difficulties are avoided or minimized by use of the present system.

Among the several objects of the invention may be noted the provision of a color display system for the production of colored images having more natural and pleasing color renditions; the provision of a color display system of this class which may be operated compatibly with the alternative production of achromatic images; the provision of such a system requiring no shadow masks in its display tube or expensive means for emplacing phosphors therein and which may be more readily regulated for image adjustment then heretofore; the provision of such a system which does not require exceptionally high voltages or voltage differentials; and the provision of an improved system which may be used in conjunction with presently operating television transmitters which broadcast in accordance with NTSC standards. Other objects and features will be in part apparent and in part pointed out hereinafter.

The invention accordingly comprises the elements and combinations of elements, steps and sequence of steps, features of construction and manipulation, and arrangements of parts which will be exemplified in the constructions and methods hereinafter described, the scope of which will be indicated in the following claims.

In the accompanying drawings, in which two of various possible embodiment of the invention are illustrated, FIGURE 1 is an enlarged schematic representation in section of various colored light-emitting phosphor particles;

FIGURE 2 is a greatly enlarged view in section schematically showing a random dispersion of the particles of FIGURE 1 on a transparent face plate or screen support, a stream of exciting electrons being illustrated by dashes;

FIGURE 3 schematically illustrates an electronic display tube employing the viewing screen of FIGURE 2;

Corresponding reference characters indicate corresponding parts throughout the several views of the drawings.

Hereinafter, according to color parlance, the terms hue, value or luminance, and saturation or chroma will have the following meanings:

Hue refers to the different visual effects of the light spectrum (effected by variations in light wavelengths therein), which are referred to by names such as red, orange, yellow, green, blue, violet, and including intermediate hues under various names such as cyan, magenta, purple, et cetera. Monochromatic light is that which is generated by a relatively narrow band of wavelengths forming a hue.

The term value or luminance is defined as the brightness of light. In the case of hues it may be measured by comparison with brightnesses as exhibited on an achromatic scale of neutral grays ranging from white to black.

The term saturation or chroma is that property of a hue at a given value which indicates its purity of color or deviation from a gray of equal value. Unsaturated colors are those in which the principal hue is diluted by a substantial amount of white or achromatic light. Achromatic or neutral light is that which, to an observer, is not sufficiently saturated to be identifiable as to any particular hue. Such light is therefore characterized simply as warm or cool, depending upon whether longer or shorter light waves predominate to give the warm or cool effect.

Figure 1:
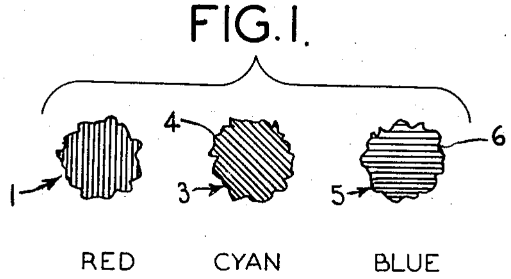

Referring now more particularly to schematic FIGURE 1, there are illustrated individual particles, of substantially greater-than-molecular size, of three different colored light-emitting or hue-producing phosphors 1 (red), 3 (cyan) and 5 (blue). These are variously cross-hatched to indicate the various hues that they produce. The particles are of a size, for example, in the order of 8–10 microns.

The particles 1, 3 and 5 are rendered differently responsive to electrons of differing energies or velocities by providing at least two of the different types of particles with different barrier layers. These barrier layers are employed for the purpose of limiting entry of electrons into the respective phosphors to those electrons having kinetic energies greater than a respective predetermined level. Other things being equal, the number of electrons entering a particle determines its luminance, which subjectively to the eye is called brightness or value.

Phosphor particles 1 will be excited to emit red light when struck by electrons of at least a first predetermined velocity or energy level. By providing cyan-light-producing phosphor particles 3 with a surface layer 4, blue-light-producing phosphor particles 5 with a surface layer 6, particles 3 will be excited to emit cyan light when struck by electrons of at least a second predetermined velocity or energy level, and particles 5 will be excited to emit blue light when struck by electrons of at least a third predetermined velocity or energy level.

Figure 5:
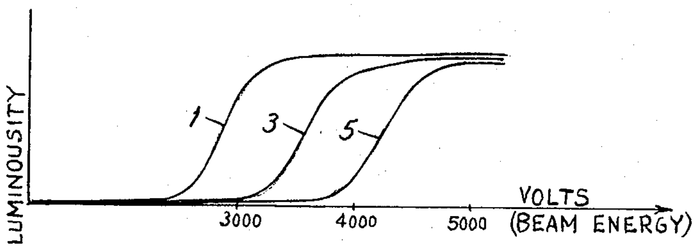
FIGURE 5 is a graph illustrating the response of the various color-forming particles to electron beams of differing energies.

The surface barrier layers 4 and 6 may be surface films or coatings of a material, such as silicon dioxide, applied in differing thicknesses on particles 3 and 5 thereby providing these respective particles with different electron breakthrough barriers. These phosphor particle barrier layers may also be provided by selective out-diffusion or in-diffusion of impurities. For example, the surfaces of blue phosphor (zinc sulfide, silver activated) particles 5 may be altered chemically by out-diffusion or chemical exchange to substantially remove the silver activator from the outer surface. Similarly the surfaces of phosphor particles 3 and 5 may be chemically altered by surface reaction with oxygen to form an oxide layer. Thus, any of the conventional phosphors in particulate form may be physically coated or surface altered, or a combination thereof, to provide each of at least two different-color emitting phosphors with surface layers so that each of the three types of phosphor particles 1, 3 and 5 has different electron breakthrough characteristics or energy thresholds. Thus particles 1, 3 and 5 will be excited by electrons having energies, for example, not substantially less than 3000 v., 4000 v., and 5000 v., respectively. A typical response of the various particles 1, 3 and 5 to electron beams of differing electron energies or voltages is represented in FIGURE 5. Because of barrier layers 4 and 6, accelerating voltages not substantially less than these exemplary thresholds are required for driving electrons into the particles 1 (red), 3 (cyan) and 5 (blue), respectively. Thus it will be seen that each phosphor particle 1, 3, 5 emits light of its respective color whenever the voltage or kinetic energy level of any electrons impinging upon the particle exceeds the threshold value determined by the barrier film around it. The barrier layers of the particles are transparent or translucent enough in the thicknesses employed to transmit its respective colored light when the particle is sufficiently excited.

Figure 2:
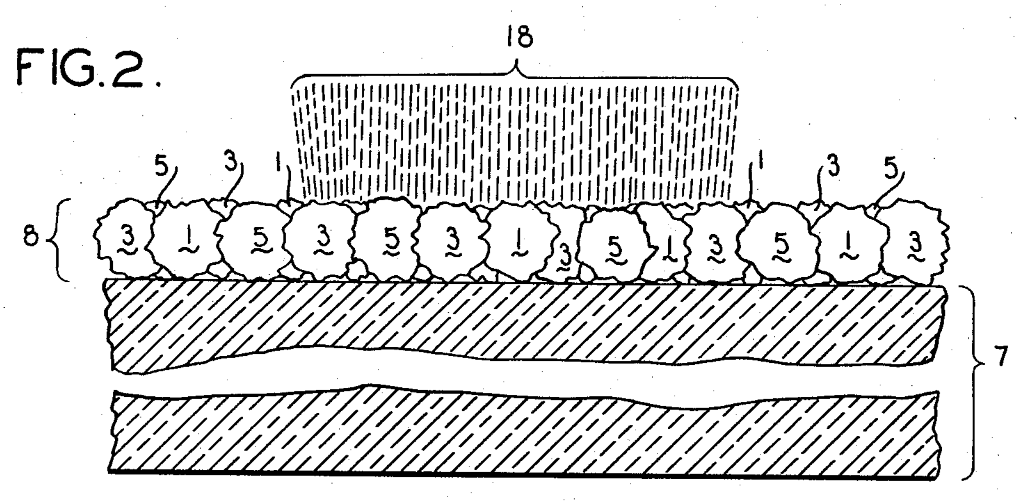

In FIGURE 2 is shown a cathode ray tube viewing screen including a transparent glass face plate 7 on which is located a layer 8, substantially one particle in thickness, of randomly dispersed particles 1, 3 and 5. The particles are closely packed in layer 8 so as to be directly subjected sequentially in small domains to a narrow electron scanning stream illustrated at 18 without being shaded from the stream by any substantial number of overlying particles. Each domain contains some of each of the different phosphor particles 1, 3 and 5. To provide such a layer of particles does not require costly deposition processes such as formerly used in penetration type tubes. Thus our particles may be economically applied by flushing on the glass a thin liquid slurry of a homogeneous or random mixture of the particles 1, 3, 5 suspended in a suitable vehicle, followed by pouring off of any excess and evaporation or drying of the remainder.

At numeral 11 is shown a cathode ray tube having the phosphor layer 8 located on the inside surface of face plate 7. At 12, 13 and 14 are three electron guns producing three scanning electron beams 15, 16 and 17 which converge to form a scanning stream at 18 composed of a mixture of the beamed electrons. The stream at 18 at any instant covers a small domain in which, on a statistical basis, are some red, cyan and blue phosphor particles 1, 3 and 5. The guns 12, 13 and 14 operate at said different voltages with respect to layer 8, e.g., at 3000 v., 4000 v. and 5000 v., respectively, which voltages correspond to the different threshold voltages of the particles 1, 3 and 5 respectively. As noted previously, the energy levels or velocities of the electrons in stream 18 determine their respective abilities to energize the phosphor particles 1, 3 and 5 through their respective barriers 2, 4 and 6. Accordingly, electrons emitted from gun 12 as beam 15 will excite substantially only the red phosphor particles 1; the electrons emitted from gun 13 as beam 16 will excite both the cyan phosphor particles 3 and the red phosphor particles 1; and the electrons emitted from gun 14 as beam 17 will excite all of the red, cyan and blue phosphor particles 1, 3, 5. Circuitry for three-gun scanning operation using different accelerating voltages is known; see, for example, Moles U.S. Patent 3,114,795. Since the electron velocities in the three beams 15, 16 and 17 are different, deflection compensation, for example as taught in the Moles patent, is provided.

As the stream 18 containing beams 15–17 at the layer 8 is scanned over layer 8, the intensity, or beam current, of the electron beam emitted from each of the guns 12, 13 and 14 is modulated in conventional manner as a function of a respective information signal or color record, that is, it is the number of electrons emitted from each gun that is varied in contrast to any variation in the respective accelerating voltages. With reference to television practice according to present standards (NTSC, SECAM and PAL) the signals which preferably control the three guns 12, 13 and 14 are the so-called red, green and blue signals, respectively.

Figure 4:
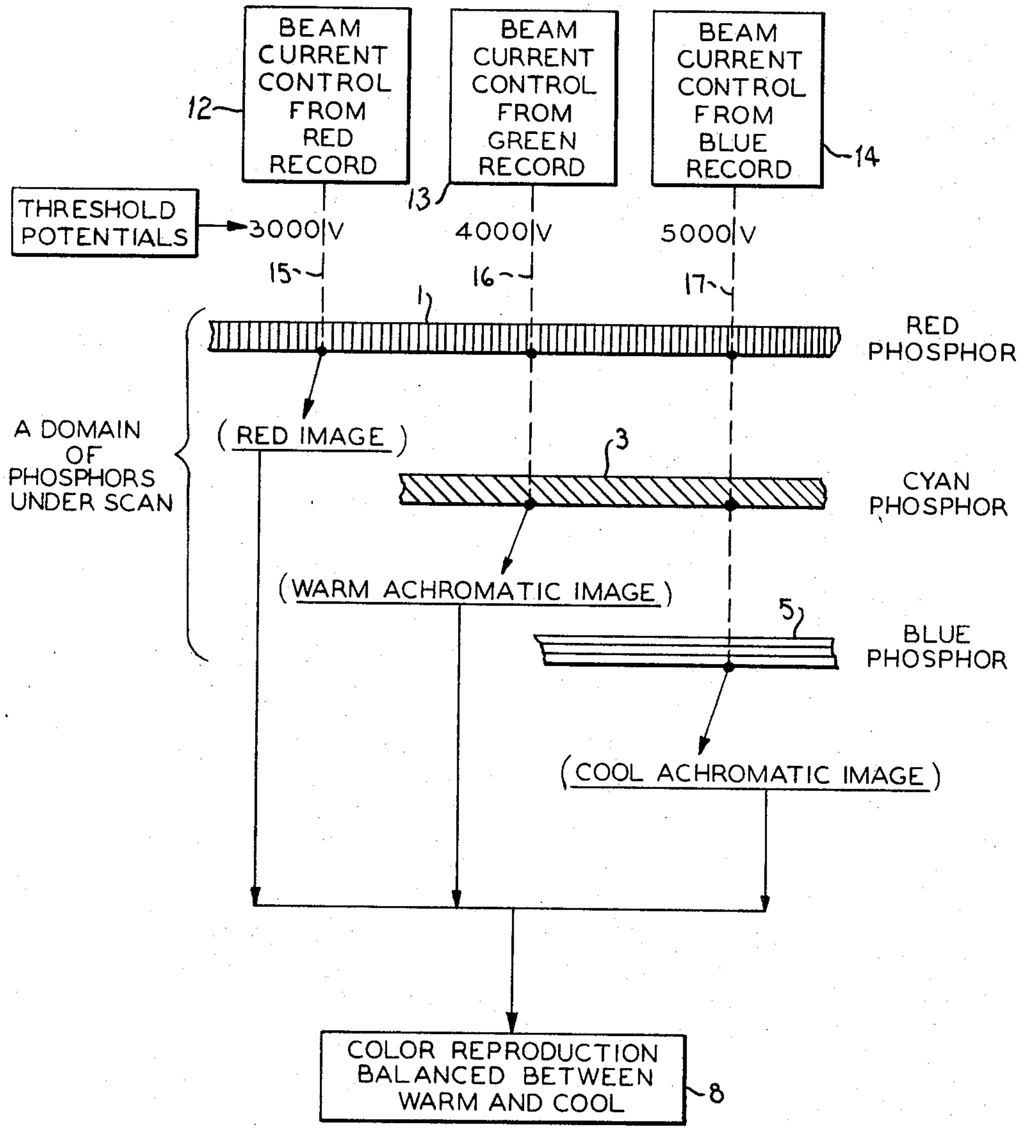
FIGURE 4 is a diagram illustrating operation of a system of the present invention.

As illustrated diagrammatically in FIGURE 4, electron beam 15 from gun 12 will excite the red phosphor only, thereby forming a red image on the layer 8, the image being in conformance with the signal or record which controls gun 12. The beam 16, on the other hand, since it possesses an energy level which is above the thresholds of both the red (1) and the cyan (3) phosphor particles, will excite both of these phosphors. Since cyan is substantially complementary in color to red, beam 16 will produce an image in light which is substantially achromatic, although with a generally warm cast. This warm achromatic image is formed in conformance with the information contained in the signal or record which controls gun 13. The beam 17 from gun 14 is accelerated by a high enough voltage to excite all three kinds of phosphor particles and thus the signal applied to gun 14 produces a cool achromatic image.

While the conventionally produced television signals or records applied to the guns 12, 13 and 14 produce red, warm achromatic and cool achromatic images respectively (due to the additive or cumulative energizations of the different phosphors with increasing beam energies) rather than the pure red, green and blue images as contemplated upon the establishment of the present television standards, it has been found that the composite color reproduction is pleasing in color balance and subjectively appears to include hues of greater saturation than are actually present in the colorimetric sense. Further, it has been found that the apparent hues produced are not as sensitive to phase shifts in the NTSC chrominance subcarrier as are the hues produced in conventional displays based upon the separate development of three images of highly saturated hues. Accordingly, tones which depend upon relatively subtle shadings, for example flesh tones, are generally more pleasing and are not subject to the green or magenta cast which often affects more conventional displays.

As contrasted with know penetration type color display tubes in which individual phosphor layers are selectively energized in response to respective control signals or records, the display according to the present invention permits much lower accelerating voltages to be used with relatively small differentials between the voltages needed to excite the different component images which make up the composite display. The use of lower voltages and differentials considerably reduces the complexity and cost of the necessary control circuitry.

It should be noted that the display according to the invention is entirely compatible, that is, when the three guns 12–14 are each provided with the same signal or record as contemplated by the NTSC standards, an essentially achromatic image is produced.

Although the means above described serve as one example for carrying out the invention, it will be understood that equivalent means, only certain of which are expressly disclosed hereinafter, are intended to be covered by the appended claims. Thus, for example, a single gun controlled sequentially from the three different records may be employed for field-, line- or dot-sequential scanning. While the use of a single randomly dispersed layer of the phosphors is preferred, individual layers of red, cyan and blue phosphor particles having respective individual barrier layers can be employed at some extra cost of application by adjusting their respective dispersions to prevent or minimize shadowing by particles in one layer of the electrons from particles in other layers. Similarly, sufficiently thin continuous layers of phosphor, e.g., deposited layers, can be used if interlayer barriers typically employed in the prior art to selectively peak absorption within a single layer are eliminated thereby permitting the cumulative or additive excitation of the phosphors which is involved in the present invention.

Figures 6, 7:
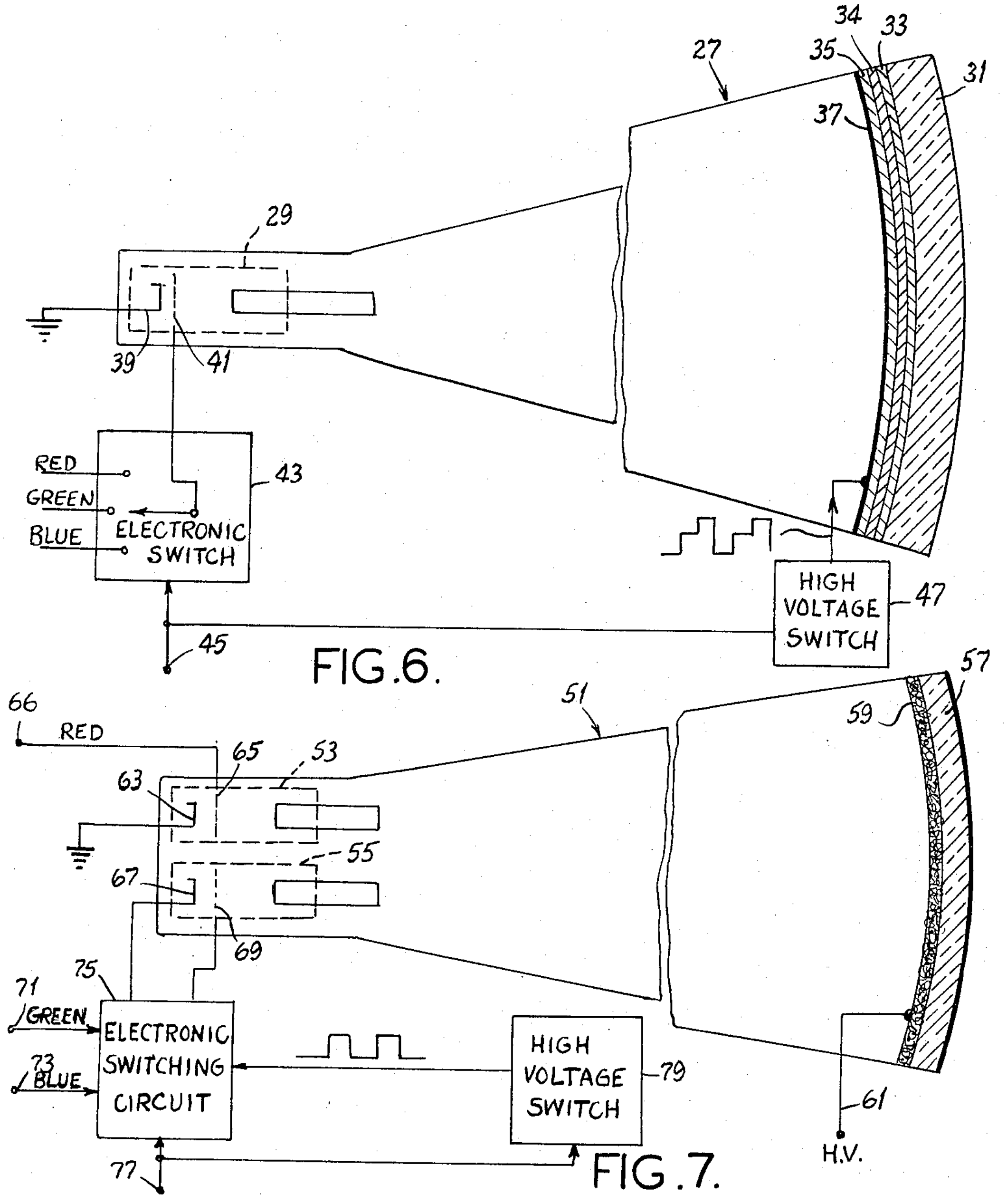
FIGURE 6 illustrates a single-gun display system employing layered phosphors.
FIGURE 7 illustrates a two-gun embodiment of this invention.

In FIGURE 6 is shown a display system employing a kinescope 27 having but one electron gun 29. The kinescope includes a viewing screen comprising a face plate 31 the inner surface of which is coated with three sequentially deposited layers 33, 34 and 35 of different phorphors. The phosphor layers are coated with a thin, electron-permeable aluminum film 37 by means of which an electron beam accelerating voltage can be applied to the screen. Phosphor layer 35 emits red light when energized by an electron beam. Phosphor layer 34 emits cyan light when energized and layer 33 emits blue light when energized. The layer 33 is relatively permeable to the light emitted by layers 34 and 35, and layer 34 transmits the light emitted from layer 35. The layer 35 which is nearest to gun 29 acts as a barrier to electrons emitted from the gun thereby limiting the electrons which can reach the layers 33 and 34 to those having an energy greater than a first predetermined threshold. Similarly, the layers 35 and 34 together act as a barrier limiting the number of electrons which can reach layer 33 to those having an energy greater than a second predetermined threshold. It is to be understood that each of the layers 33, 34 and 35 may alternatively be constituted by discrete particles which have individual barrier layers, the particles in the innermost layers being dispersed so as to avoid significant shadowing of electron beams.

Gun 29 includes a cathode 39 from which electrons are emitted and a grid 41 for modulating the beam current or number of electrons which are formed into a beam by the gun. By means of an electronic switch 43, the modulation of the beam current is performed, during sequential time intervals, in accordance with the electronic signals which represent the red, green and blue records respectively. The switching from one color signal to the next is done on a sequential field basis under the control of a vertical synchronization signal applied at a terminal 45, although it is to be understood that line- or dot-sequential switching may also be employed.

The vertical synchronization signal also controls a high voltage switching circuit 47 which is operative to apply a three-value staircase voltage to the phosphor screen by means of aluminum film 37. The staircase voltage changes levels with sequential fields in synchronization with the changes in input signals being applied to control grid 41. Accordingly, as each input signal or color record is applied to the gun 29, a respective accelerating voltage will be applied between the gun and the phosphors. When the red signals is applied to the grid 41, a relatively low accelerating voltage is applied so that the electron beam will penetrate only into the red phosphor 35 thereby producing a red image in response to the red record. When the green signal is applied to grid 41, an intermediate accelerating voltage is applied from circuit 47 so that the electron beam emitted from gun 29 can penetrate and excite both the red 35 and cyan 34 phosphors thereby producing a warm achromatic image. When the blue signal is applied to grid 41, circuit 47 applies the highest of the staircase voltages to the phosphor screen so that the electron beam emitted from gun 29 can penetrate and excite all three phosphor layers thereby producing a cool achromatic image. As explained previously with reference to FIGURE 4 these three images combine to yield a pleasingly balanced polychromatic image.

Figure 3:
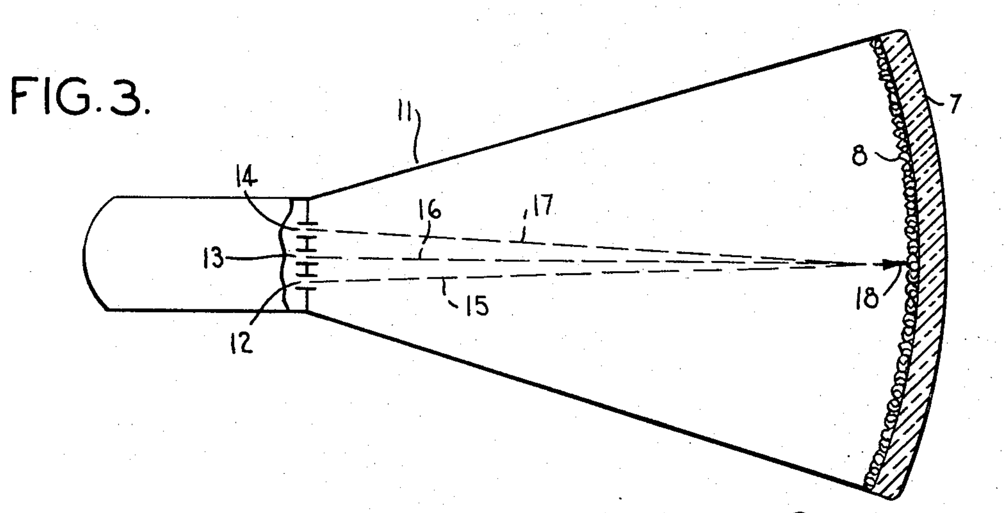

FIGURE 7 illustrates an embodiment of the display system which employs both simultaneous and sequential energizations of the various phosphors. This system employs a kinescope 51 having a pair of electron beam guns 53 and 55 and a face plate 57, the interior surface of which is coated with a mixed layer 59 of differently responsive phosphor particles such as the layer 8 shown in FIGURE 3. An electron beam accelerating voltage is applied to layer 59 at a terminal 61.

Gun 53 includes a cathode 63 which is held at ground potential and a grid 65 which is continuously controlled by the red signal which is applied to a terminal 66. Gun 55 includes a cathode 67 and a grid 69. The relative voltage of grid 69 with respect to cathode 67, that is the voltage which modulates the current of the electron beam emitted from gun 55, is alternately controlled by the video green signal applied to a terminal 71 and the video blue signal applied to a terminal 73. The alternate connections are established by an electronic switching circuit 75 operated under the control of a horizontal sync signal applied at a terminal 77. The horizontal sync signal also controls a high voltage switch circuit 79 which applies a high voltage square wave, e.g., 1000 v. P–P, to an electronic switching circuit 75. This square wave is applied, through the electronic switching circuit 75, to both grid 69 and cathode 67 to periodically vary the accelerating voltage which is applied to electrons emitted from gun 55. Thus electrons which are emitted in response to the green record will be accelerated to a different velocity from those emitted in response to the blue record, both of these velocities being different from the velocity of the electrons emitted from gun 53.

The electron beam emitted from gun 53 is accelerated at a relatively low voltage so that it will excite only the red phosphors in layer 59 thereby continuously producing a red image visible through face plate 57.

When the cathode 67 of gun 55 is at the lower of the two voltages provided from the switch circuit 79, the electron beam emitted from gun 55 will produce a warm achromatic image on the screen. On alternate lines, how ever, the electron beam emitted from gun 55 will excite all of the phophors in the layer 59 thereby producing a cool achromatic image, the cool achromatic image being interlaced, on an alternate line basis, with the warm achromatic image. In a manner similar to the effect obtained in the previous examples, the interlaced warm and cool achromatic images and the coextensive red image combine to form a pleasingly balanced color image.

In view of the above, it will be seen that the several objects of the invention are achieved and other advantageous results attained.

As various changes could be made in the above constructions and methods without departing from the scope of the invention, it is intended that all metter contained in the above description or shown in the accompanying drawings shall be interpreted as illustrative and not in a limiting sense.

What is claimed is:

1. A color display system for producing colored images from a plurality of records, said system comprising:

a viewing screen including a first phosphor which when energized emits light of relatively long wavelengths, a second phosphor which when energized emits light substantially complementary in color to that emitted by said first phosphor, and a third phosphor which when energized emits light of wavelengths generally shorter than that emitted by said second phosphor, means for energizing said first phosphor in response to a first record thereby to produce a corresponding image in light of said relatively long wavelengths, means for independently simultaneously energizing both said first and second phosphors in response to a second record thereby to produce a corresponding image in warm substantially achromatic light, and means for independently simultaneously energizing all of said phosphors in response to a third record thereby to produce an image corresponding to said third record in cool substantially achromatic light.

2. A color display system as set forth in claim 1 wherein:

said first phosphor is energized to emit light only when excited by electrons having a velocity of at least a first predetermined value, said second phosphor is energized to emit light only when excited by electrons having a velocity of at least a second predetermined value which is greater than said first value, said third phosphor is energized to emit light only when excited by electrons having a velocity of at least a third predetermined value which is greater than said second value, said means for energizing said first phosphor comprises means for generating a first beam of electrons having a velocity of said first predetermined value and an intensity modulated in accordance with a first signal which is a function of said first record, said means for independently and simultaneously energizing said first and second phosphors comprises means for generating a second beam of electrons having a velocity of said second predetermined value and an intensity modulated in accordance with a second signal which is a function of said second record, and said means for independently and simultaneously energizing all said phosphors comprises means for generating a third beam of electrons having a velocity of said third predetermined value and an intensity modulated in accordance with a third signal which is a function of said third record.

3. A color display system as set forth in claim 2 wherein:

said first phosphor when energized emits substantially red light, said second phosphor when energized emits substantially cyan light, said third phosphor when energized emits substantially blue light, said first, second and third signals respectively comprise the red, green and blue signals generated in a conventional color television receiver, whereby said three records produce images in substantially red light, warm substantially achromatic light, and cool substantially achromatic light respectively.

4. A color display system as set forth in claim 2 wherein:

the means for generating said first, second and third beams of electrons comprise three separate electron guns each continuously generating said electron beams, said system further including means for bringing said beams into coincidence at said screen, and means for sweeping the beams in unison across said screen in a scanning pattern.

5. A color display system as set forth in claim 2 wherein:

the means for generating said first, second and third beams of electrons comprise a single electron gun, and switching means for sequentially applying first, second and third accelerating voltages to the electrons generated by the gun to provide them with said first, second and third velocities respectively while sequentially controlling the intensities of said electron beams of said three respective velocities in accordance with said first, second and third records respectively.

6. A color display system as set forth in claim 2 wherein:

the means for generating said first beam of electrons comprises a first electron gun and means for applying a first accelerating voltage to electrons generated by said gun, the means for generating said second and third beams of electrons comprises a second electron gun and means for alternately applying second and third accelerating voltages to electrons generated by said second gun;

said system further comprising means for controlling the intensities of the electrons generated by said second gun in accordance alternately with said second and third records.

7. A color display system as set forth in claim 2 wherein:

each of said phosphors comprises a separate thin discrete layer of particles.

8. A color display system as set forth in claim 7 wherein:

the particles of said third phosphors comprise a layer on the inner surface of the face plate of a cathode ray tube, the particles of said second phosphor comprise a second layer on the inner surface of said third phosphor layer, and the particles of said first phosphor comprise a third layer on the inner surface of said second phosphor layer, at least said second and third phosphor layers being substantially pervious to the passage of light therethrough.

9. A color display system as set forth in claim 8 wherein:

each of said phosphors is in finely divided particulate form, the particles of at least said second and third phosphors each respectively having different surface layers each of which constitutes a partial barrier to electrons whereby said first, second and third phosphor particles have different respective electron energization thresholds.

10. A color display system as set forth in claim 2 wherein:

said screen comprises a thin continuous layer of a random mixture of said three phosphors.

11. A color display system as set forth in claim 10 wherein:

each of said phosphors is in finely divided particulate form, the particles of at least said second and third phosphors each respectively having different surface layers each of which constitutes a partial barrier to electrons whereby said first, second and third phosphor particles have different respective electron energization thresholds.

12. A color display system for producing colored images from a plurality of image-forming records from which coordinated signals are sent from a color television transmitter, said system comprising:

a viewing screen including a distribution of a first phosphor which when sequentially energized in successive domains emits light of relatively long wavelengths, a distribution of a second phosphor which when sequentially energized in successive domains emits light substantially complementary in color to that emitted by said first phosphor, and a distribution of a third phosphor which when sequentially energized in successive domains emits light of wavelengths generally shorter than that emitted by said second phosphor, means for energizing in a sequence domains of said first phosphor in response to first signals from a first of said records thereby to produce a corresponding image in light of said relatively long wavelengths, means for independently and in the same sequence simultaneously energizing coinciding domains of both said first and second phosphors in response to second signals from a second of said records thereby to produce a corresponding image in warm substantially achromatic light, and means for independently and in the same sequence simultaneously energizing coinciding domains of all of said phosphors in response to third signals from a third of said records thereby to produce an image corresponding to said third record in cool substantially achromatic light.

13. A color display system as set forth in claim 12 wherein:

said first phosphor is energized to emit light only when excited by electrons having a velocity of at least a first predetermined value, said second phosphor is energized to emit light only when excited by electrons having a velocity of at least a second predetermined value which is greater than said first value, said third phosphor is energized to emit light only when excited by electrons having a velocity of at least a third predetermined value which is greater than said second value.

14. A color display system as set forth in claim 12 wherein:

said means for energizng said first phosphor comprises means for generating a first beam of electrons having a velocity of said first predetermined value and an intensity modulated in accordance with said first signal which is a function of said first record, said means for independently and simultaneously energizing said first and second phosphors comprises means for generating a second beam of electrons having a velocity of said second predetermined value and an intensity modulated in accordance with said second signal which is a function of said second record, and said means for independently and simultaneously energizing all said phosphors comprises means for generating a third beam of electrons having a velocity of said third predetermined value and an intensity modulated in accordance with said third signal which is a function of said third record.

15. A color display system as set forth in claim 14 wherein:

said domains of said phosphors each include some of the first, second and third phosphors.

16. A color display system as set forth in claim 15 wherein:

all of the phosphors are in a single layer.

17. The method of forming polychromatic color images from a plurality of records, said images being formed on a viewing screen including a mixture of phosphors which respectively emit light of different colors and which are differentially responsive to electron beams of different energies, said method comprising:

scanning said viewing screen with electrons at a relatively low energy level to excite a red phosphor in response to a first record thereby to produce a corresponding red image on said screen, scanning said screen with electrons at an intermediate energy level to excite said red phosphor and a cyan phosphor in response to a second record thereby to produce a corresponding warm achromatic image on said screen, and scanning said screen with electrons at a relatively high energy level to excite said red and cyan phosphors and a blue phosphor in response to a third record thereby to produce a corresponding cool achromatic image on said screen, whereby said images combine to provide a balanced polychromatic image.

18. A color display system for producing colored images from a plurality of records, said system comprising:

a viewing screen including a first phosphor which when energized emits light of relatively long wavelengths, a second phosphor which when energized emits light of wavelengths generally shorter than that emitted by said first phosphor, and a third phosphor which when energized emits light of wavelengths generally shorter than that emitted by said second phosphor, means for energizing said first phosphor in response to a first record thereby to produce a corresponding image in light of said relatively long wavelengths, means for independently simultaneously energizing both said first and second phosphors in response to a second record thereby to produce a corresponding image in warm substantially achromatic light, and means for independently simultaneously energizing all of said phosphors in response ot a third record thereby to produce an image corresponding to said third record in cool substantially achromatic light.

19. A color display system for producing colored images from a plurality of image-forming records from which coordinated signals are sent from a color television transmitter, said system comprising:

a viewing screen including a distribution of a first phosphor which when sequentially energized in successive domains emits light of relatively long wavelengths, a distribution of a second phosphor which when sequentially energized in successive domains emits light of wavelengths generally shorter than that emitted by said first phosphor, and a distribution of a third phosphor which when sequentially energized in successive domains emits light of wavelengths generally shorter that than emitted by said second phosphor, means for energizing in a sequence domains of said first phosphor in response to first signals from a first of said records thereby to produce a corresponding image in light of said relatively long wavelengths, means for independently and in the same sequence simultaneously energizing coinciding domains of both said first and second phosphors in response to second signals from a second of said records thereby to produce a corresponding image in warm substantially achromatic light, and means for independently and in the same sequence simultaneously energizing coinciding domains of all of said phosphors in response to third signals from a third of said records thereby to produce an image corresponding to said third record in cool substantially achromatic light.

20. A color display system for producing polychromatic color images from at least three different records corresponding to three substantially different respective hues, said system comprising a viewing screen, and means for producing on said screen three image portions each corresponding to one of said records, one of said image portions being produced in warm substantially achromatic light, and a second of said image portions being produced in cool substantially achromatic light, whereby the composite of said image portions produces a perceived sensation of color significantly more varied in hues and saturation than that which would result based on standard colorimetric procedures.

21. A color display system as set forth in claim 20 in which said means for producing said image portions includes means for producing a third image portion in light of a relatively saturated hue.

22. A color display system as set forth in claim 20 in which said means for producing said image portions includes means for producing a third image portion in light of a relatively long wavelength.

23. A method of forming polychromatic color images from at least three different records corresponding to three substantially different respective hues, said method comprising producing on a screen a first image portion corresponding to one of said records in warm substantially achromatic light, and producing on said screen a second image portion corresponding to a second of said records in cool substantially achromatic light thereby to produce a composite of said image portions in which the perceived sensation of color is significantly more varied in hues and saturation than that which would result based on standard colorimetric procedures.

24. A method as set forth in claim 23 which includes the further step of producing on said screen an image portion corresponding to the third record in light of relatively saturated hue.

25. A method as set forth in claim 23 which includes the further step of producing on said screen an image portion corresponding to the third record in light of a relatively long wavelength.

References Cited

UNITED STATES PATENTS 3,312,781 4/1967 Land ---------------- 178—5.4

ROBERT L. GRIFFIN, *Primary Examiner.*

JOHN W. CALDWELL, *Examiner.*

J. A. O'BRIEN, R. MURRAY, *Assistant Examiners.*